F. RAKES.
WAGON-LOCK.

No. 186,618. Patented Jan. 23, 1877.

WITNESSES:
C. Wolff.
J. H. Scarborough

INVENTOR:
F. Rakes.
BY
ATTORNEYS.

UNITED STATES PATENT OFFICE.

FRANK RAKES, OF GREENUP, KENTUCKY, ASSIGNOR TO HIMSELF AND WILLIAM BRYSON, OF SAME PLACE.

IMPROVEMENT IN WAGON-LOCKS.

Specification forming part of Letters Patent No. 186,618, dated January 23, 1877; application filed December 4, 1876.

*To all whom it may concern:*

Figure 1:
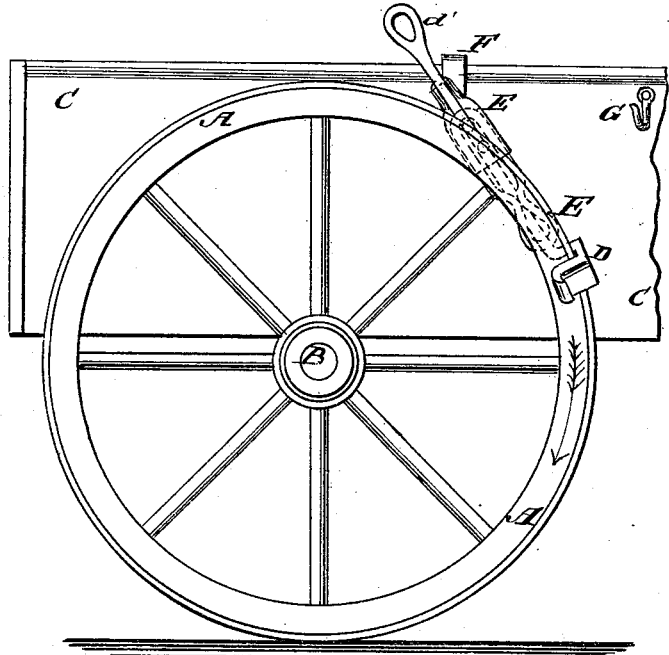
Figure 2:
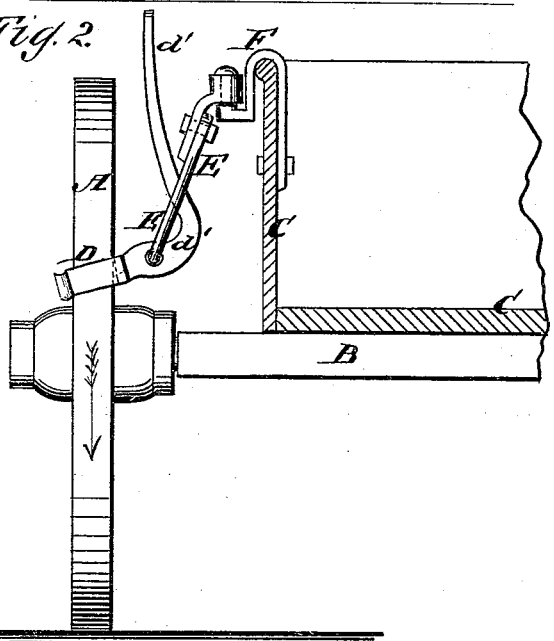

Be it known that I, FRANK RAKES, of Greenup, county of Greenup, and State of Kentucky, have invented a new and Improved Wagon-Lock, of which the following is a specification:

Figure 1 is a side view of the rear part of a wagon to which my improvement has been attached. Fig. 2 is a front view of the same, the wagon-body being shown in cross-section.

The object of this invention is to furnish an improved device for locking the wheel of a wagon, and which shall be so constructed that it may be applied to and removed from the wheel while the wagon is in motion, which shall be simple in construction, convenient in use, strong, and durable.

The invention consists in an improved wagon-lock formed of the U-shaped block, provided with the bent shank, the swiveled or pivoted link, and the strap, constructed and combined with each other, as hereinafter described, to adapt them to be applied to a wagon, as set forth.

Similar letters of reference indicate corresponding parts.

A represents the wheel, B the axle, and C the body of a wagon, about the construction of which parts there is nothing new. D is a U-shaped block, the cavity of which is made of such a size as to receive the rim of the wheel A. The shank $d'$ of the block D is bent upward, to serve as a handle in applying and removing the block D. E is a link or slotted bar, the lower end of which passes through a hole in the shank $d'$, near the U-block D. The upper end of the link or bar E is swiveled or pivoted to a strap, F, attached to the upper part of the side board of the wagon-body C. In case a swivel be used, the link E should be attached to it adjustably, so that the device may be lengthened or shortened, as the wagon to which it may be attached may require. The shank $d'$ of the block D passes up through the cavity of the link E, and the bars of the said link, near its lower end, are pressed inward or toward each other, to prevent the shank $d'$ turning out of the slot of the link. The said shank is thus kept in proper position to be readily grasped when the device is to be used, and also prevented coming in contact with the spokes of the wheel.

In place of compressing or bending in the sides of the link, a spring may be attached to the shank $d'$ in such manner as to bear against the lower part of the link.

When the device is used for the purpose of locking a wheel, the block or jaw D is applied to the wheel-rim, as shown in the drawing, and as the wheel rotates forward (see arrow) the jaw bites or clamps the sides of the tire and felly, by reason of the fact that the former, to wit, the jaw, is attached to a fixed point. The bite is given by two of the diagonally-opposite corners of the recess or cavity in the jaw, since the latter tends to assume a position parallel to the plane of the wheel.

When the device is not in use it may be hung on the hook G attached to the side of the wagon-body.

Having thus described my invention, I claim as new and desire to secure by Letters Patent—

An improved wagon-lock, formed of the U-shaped block or jaw D, provided with the bent shank $d'$, the swiveled or pivoted link E, and the strap F, constructed and combined with each other, substantially as herein shown and described, to adapt them to be applied to a wagon, as set forth.

FRANK RAKES.

Witnesses:
C. T. RATCLIFF,
E. J. BIGGS.